(12) United States Patent
Raghu et al.

(10) Patent No.: US 9,607,454 B1
(45) Date of Patent: Mar. 28, 2017

(54) SYSTEM FOR DISTINGUISHING BETWEEN TRAFFIC JAM AND PARKED VEHICLES

(71) Applicants: VOLKSWAGEN AG, Wolfsburg (DE); AUDI AG, Ingolstadt (DE)

(72) Inventors: Kaushik Raghu, Redwood City, CA (US); Somudro Gupta, Belmont, CA (US); Tobias Steiner, Isenbuettel (DE)

(73) Assignees: VOLKSWAGEN AG, Wolfsburg (DE); AUDI AG, Ing (DE)

( * ) Notice: Subject to any disclaimer, the term of this patent is extended or adjusted under 35 U.S.C. 154(b) by 0 days.

(21) Appl. No.: 14/930,330

(22) Filed: Nov. 2, 2015

(51) Int. Cl.
*G05D 1/00* (2006.01)
*G07C 5/08* (2006.01)
*B60W 30/06* (2006.01)
*G08G 1/01* (2006.01)

(52) U.S. Cl.
CPC ........... *G07C 5/0808* (2013.01); *B60W 30/06* (2013.01); *G05D 1/0088* (2013.01); *G08G 1/01* (2013.01); *B60W 2400/00* (2013.01); *B60W 2900/00* (2013.01)

(58) Field of Classification Search
CPC ...... G07C 5/0808; G05D 1/0088; G08G 1/01; B60W 30/06; B60W 2900/00; B60W 2400/00
USPC ............................................. 701/23-36, 29.3
See application file for complete search history.

(56) References Cited

U.S. PATENT DOCUMENTS

| | | | |
|---|---|---|---|
| 7,088,262 B2* | 8/2006 | Schindler | B60Q 9/005 340/436 |
| 9,308,913 B2* | 4/2016 | Mukaiyama | E05B 77/54 |
| 2007/0040701 A1* | 2/2007 | Browne | G08G 1/143 340/932.2 |
| 2010/0302068 A1* | 12/2010 | Bandukwala | H04W 4/046 340/932.2 |
| 2011/0133957 A1* | 6/2011 | Harbach | G08G 1/14 340/932.2 |
| 2011/0140922 A1* | 6/2011 | Levy | G08G 1/144 340/932.2 |
| 2012/0010797 A1* | 1/2012 | Luo | F02N 11/0837 701/70 |
| 2012/0200430 A1* | 8/2012 | Spahl | G01C 21/3685 340/932.2 |
| 2012/0262305 A1* | 10/2012 | Woodard | G08G 1/147 340/932.2 |
| 2013/0257632 A1* | 10/2013 | Harber | G08G 1/0112 340/932.2 |
| 2013/0268152 A1* | 10/2013 | Koshizen | B60L 15/2045 701/22 |
| 2014/0347196 A1* | 11/2014 | Schulz | G08G 1/096716 340/932.2 |
| 2014/0350853 A1* | 11/2014 | Proux | G01C 21/34 701/533 |
| 2014/0379258 A1* | 12/2014 | Beaurepaire | G01C 21/34 701/533 |
| 2015/0039173 A1* | 2/2015 | Beaurepaire | B60W 30/06 701/23 |
| 2015/0130638 A1* | 5/2015 | Bahgat | G08G 1/146 340/932.2 |
| 2015/0339920 A1* | 11/2015 | Cortelyou | G08G 1/01 340/907 |

(Continued)

*Primary Examiner* — Tyler J Lee
(74) *Attorney, Agent, or Firm* — Barnes & Thornburg LLP

(57) ABSTRACT

A system for identifying the status of a group of secondary vehicles. The system determines whether the group of secondary vehicles are parked or part of a traffic jam.

19 Claims, 5 Drawing Sheets

(56) References Cited

U.S. PATENT DOCUMENTS

2015/0353080 A1* 12/2015 Mukaiyama ............ E05B 77/54
701/23
2016/0068158 A1* 3/2016 Elwart ................. B60W 10/00
701/41

* cited by examiner

SYSTEM FOR DISTINGUISHING BETWEEN TRAFFIC JAM AND PARKED VEHICLES

BACKGROUND

The present disclosure relates to systems, components, and methodologies for determining a status of a group of vehicles. In particular, the present disclosure relates to systems, components, and methodologies that improve determinations of a status of a group of vehicles as parked or as in a traffic jam.

SUMMARY

According to the present disclosure, systems, components, and methodologies are provided for determining a status of a group of vehicles as being parked or as being in a traffic jam.

In illustrative embodiments, traffic jam identification system determines whether a group of secondary vehicles adjacent to a primary vehicle are part of a traffic jam or parked. The traffic jam identification system receives data regarding the secondary vehicles and location data regarding the primary vehicle to calculate a probability that the secondary vehicles are in a traffic jam. Detected active-status indicators of the secondary vehicles and the location being categorized as one of controlled access where pedestrians are not likely to be present increase this probability. The traffic jam identification system compares the calculated probability against a predetermined threshold limit to determine whether the secondary vehicles are in a traffic jam or parked.

In illustrative embodiments, access to autonomous driving and auto-park functions of the primary vehicle is controlled based, at least in part, on the determined status of the secondary vehicles.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
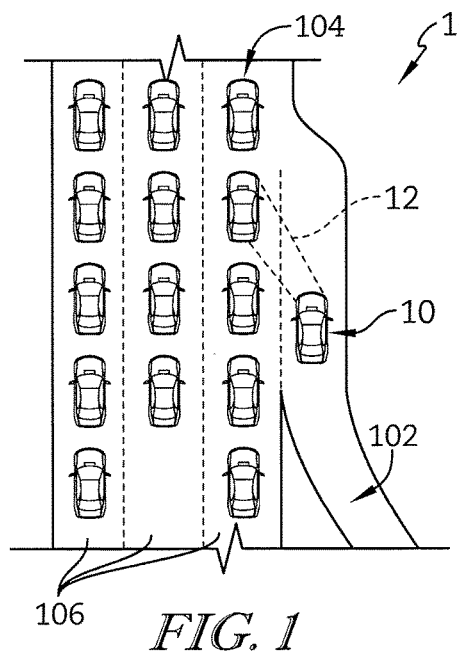
FIG. 1 shows a stretch of highway with a group of secondary vehicles in a traffic jam wherein a primary vehicle incorporating a traffic jam identification system in accordance with the present disclosure is entering the highway and analyzing the secondary vehicles to determine a status of the group of secondary vehicles.

FIG. 1 shows a highway 100 having an on-ramp 102 connecting with lanes 106 of highway 100. A primary vehicle 10 entering highway 100 from an on-ramp 102 captures data 12 regarding secondary vehicles 104 on highway 100. Data 12 is used by a traffic jam identification system 20 in accordance with the present disclosure to determine a status of secondary vehicles 104 as being parked or in a traffic jam as suggested in FIG. 7.

Figure 2:
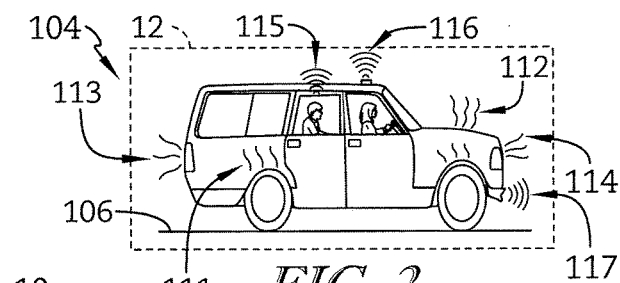
FIG. 2 is a detail view of FIG. 1 taken from the perspective of the primary vehicle which shows one of the secondary vehicles from the group of secondary vehicles, wherein identifying features regarding the secondary vehicle's status including light emissions, thermal emissions, audio emissions, radio emissions, and other identifiers are collected by the primary vehicle to determine a status of the secondary vehicle which is likely part of a traffic jam due to the presence of several active-vehicle indicators.

In the illustrative embodiment, data 12 includes information regarding thermal emissions 111, 112, light emissions 113, 114, audio emissions 115, and radio emissions 116, 117 from secondary vehicle 104 as suggested in FIG. 2. These emissions 111-117 act as active-status indicators which increase a probability that secondary vehicle 104 is in use and part of a traffic jam with other secondary vehicles 104. In some embodiments, data regarding multiple secondary vehicles 104 in a group of adjacent secondary vehicles is captured and compared when determining the probability of a traffic jam.

Figure 3:
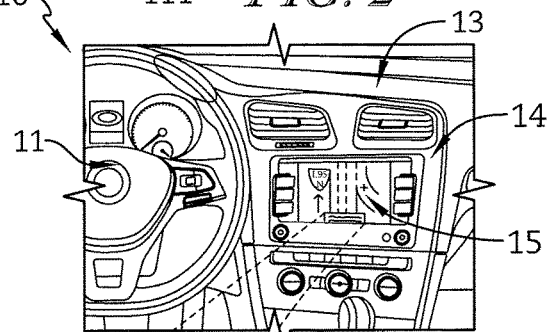
FIG. 3 is a partial perspective view of an interior of the primary vehicle which shows a navigation screen displaying the present location of the primary vehicle, wherein the navigation screen is displaying messages to indicate to a user of the primary vehicle that a traffic jam is ahead and that the use of an automated driving function of the primary vehicle is available for use based on analysis of the primary vehicle's location and status of the group of secondary vehicles.
Figure 7:
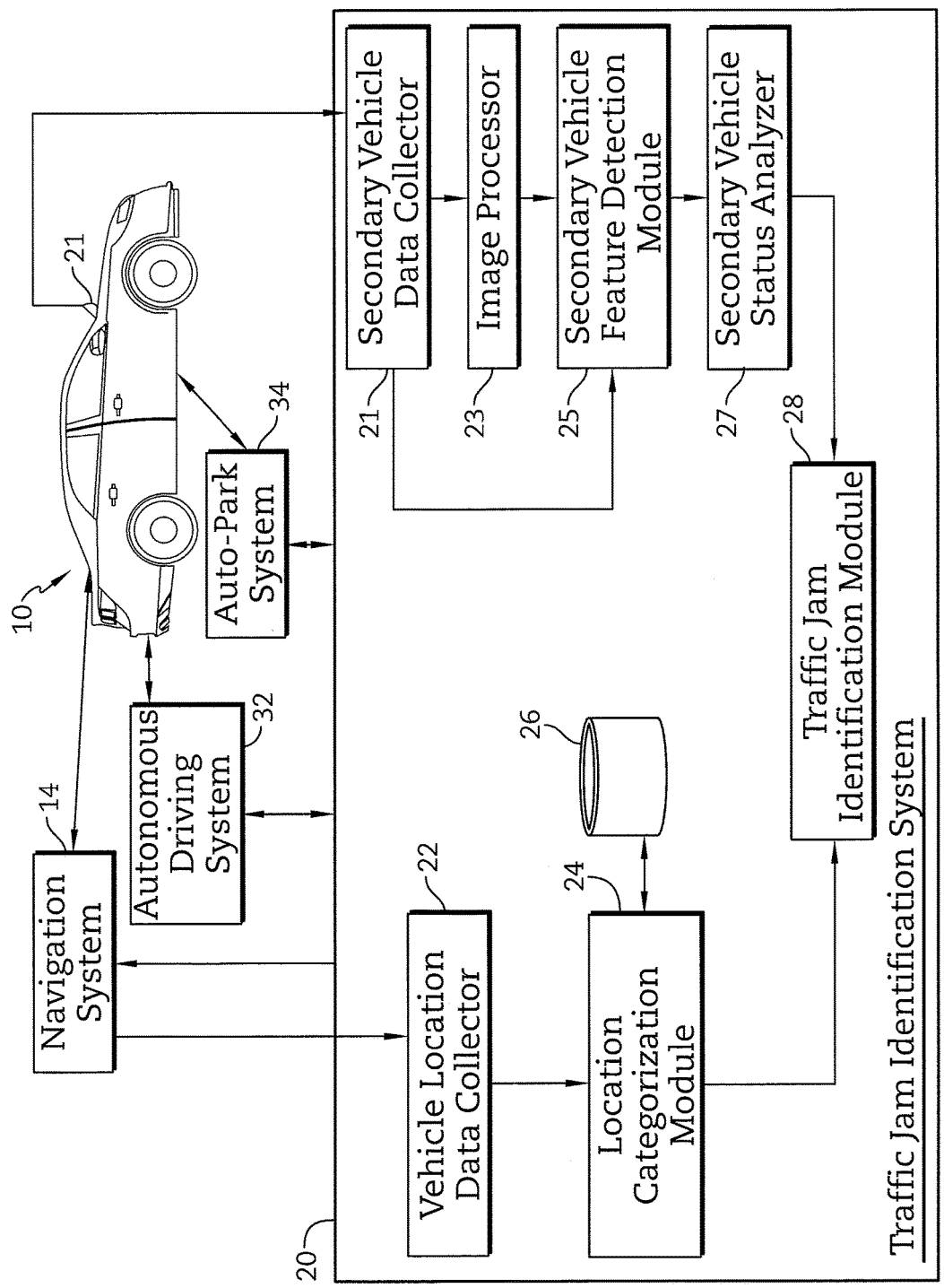
FIG. 7 is a diagrammatic view of a traffic jam identification system in accordance with the present disclosure that includes one or more data collectors configured to collect vehicle location and secondary vehicle data, one or more image processors configured to process data collected by the one or more data collectors, a secondary vehicle feature detection module configured to detect active-vehicle indicators, a location categorization module configured to categorize the location of the primary vehicle, a secondary vehicle status analyzer configured to analyze characteristics of detected active-vehicle indicators, and a traffic jam identification module configured to determine the status of the group of secondary vehicles based on a probability that the secondary vehicles are part of a traffic jam or parked, wherein the traffic jam identification system communicates with a navigation system and an autonomous driving system of the primary vehicle.

Location data of primary vehicle 10 is also used in determining the status of secondary vehicles 104 as suggested in FIGS. 3 and 7. In the illustrative embodiment, vehicle 10 includes a steering wheel 11, dashboard 13, and a navigation system 14 as shown in FIG. 3. A display 15 of navigation system 14 shows location data for primary vehicle 10 and indicates that primary vehicle 10 is on highway 104, which further increases the probability that adjacent secondary vehicles 104 are in a traffic jam.

In the illustrative embodiment, a notification 16 of a traffic jam ahead is displayed to a user of primary vehicle 10 if the probability that adjacent secondary vehicles 104 are in a traffic jam, as determined by traffic jam identification system 20, reaches or exceeds a predetermined threshold limit as suggested in FIG. 3. In some embodiments, a prompt 18 is displayed to the user to activate an autonomous driving function of vehicle 10 which operates when vehicles 10, 104 are in a traffic jam. In some embodiments, identification of a traffic jam prompts primary vehicle 10 to send location data to a server for mapping traffic patterns. Other uses for identification of traffic jams are also contemplated.

Figure 4:
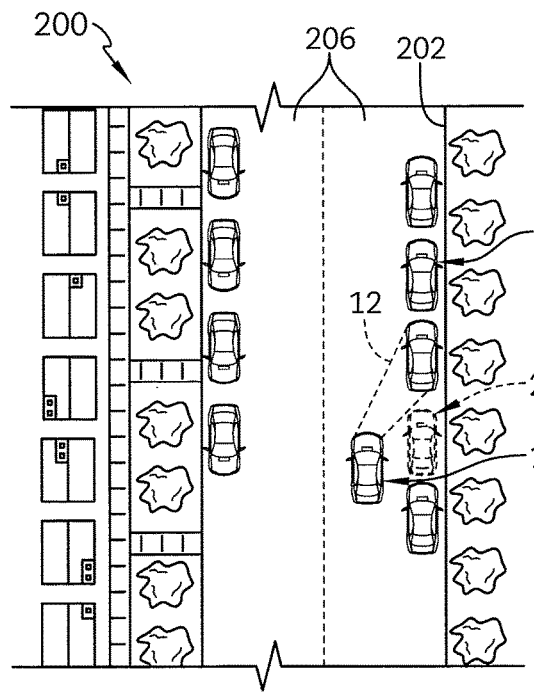
FIG. 4 shows a stretch of residential roadway with a group of secondary vehicles parked along a side of the roadway, wherein the primary vehicle is driving along the roadway to park along the side of the roadway and analyzing the secondary vehicles to determine a status of the group of secondary vehicles.

FIG. 4 shows a residential roadway 200 having lanes 206. Primary vehicle 10 driving on roadway 200 captures data 12 regarding secondary vehicles 204 positioned alongside a curb 202 of right-side lane 206. An opening 208 for primary vehicle 10 to park in is also identified as part of an auto-park function of primary vehicle 10 if it is determined that secondary vehicles 204 are also parked.

Figure 5:
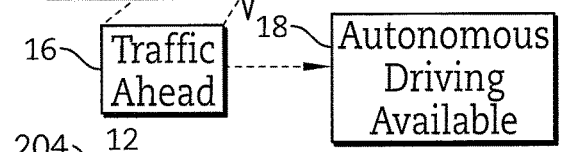
FIG. 5 is a detail view of FIG. 5 taken from the perspective of the primary vehicle which shows one of the secondary vehicles from the group of secondary vehicles, wherein identifying features regarding the secondary vehicle's status including light emissions, thermal emissions, audio emissions, radio emissions, and other identifiers are collected by the primary vehicle to determine a status of the secondary vehicle which is likely part of a group of parked vehicles due to the lack of active-vehicle indicators.

Data 12 captured by primary vehicle 10 shows that secondary vehicle 204 lacks any active-status indicators, as suggested in FIG. 5, making the probability that secondary vehicles 204 are part of a traffic jam low and more likely that secondary vehicles 204 are parked. Location data of primary vehicle 10 indicates that primary vehicle 10 is travelling on residential roadway 200, as suggested in FIG. 6, which may confirm that the probability of secondary vehicles 204 being part of a traffic jam is low and more likely that secondary vehicles 204 are parked.

Figure 6:
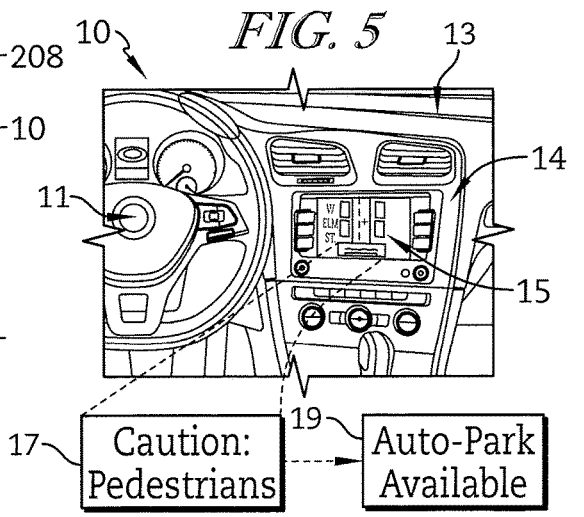
FIG. 6 is a partial perspective view of the interior of the primary vehicle which show the navigation screen displaying the present location of the primary vehicle, wherein the navigation screen is displaying messages to indicate to a user of the primary vehicle that pedestrians may be present in the area and that the use of an auto-park function of the primary vehicle is available for use based on analysis of the primary vehicle's location and status of the group of secondary vehicles.

In the illustrative embodiment, a notification 17 that pedestrians may be present is displayed to a user of primary vehicle 10 if it is determined by traffic jam identification system 20 that secondary vehicles 204 are parked on a residential or other non-controlled access roadway as suggested in FIG. 6. In some embodiments, a prompt 19 is displayed to the user to activate the auto-park function of vehicle 10 to guide primary vehicle 10 into opening 208. In some embodiments, access to the autonomous driving function of primary vehicle 10 is blocked if it is determined that primary vehicle 10 is on a residential or other non-controlled access roadway.

In an illustrative embodiment, the autonomous driving function of a primary vehicle uses radar based cruise control to maintain spacing from other secondary vehicles on the roadway. Such a radar based system may not be able to distinguish objects smaller than a vehicle, such as a pedestrian or bicycle user. In such an embodiment, access to the autonomous driving function may be blocked if the primary vehicle is on a non-controlled access roadway where pedestrians are likely to be present.

FIG. 7 shows a traffic jam identification system 20 in accordance with the present disclosure. In the illustrative embodiment, traffic jam identification system 20 is provided on primary vehicle 10, which also includes navigation system 14, an autonomous driving system 34 configured to perform the autonomous driving function, and an auto-park system 36 configured to perform the auto-park function. In some embodiments, navigation system 14, autonomous driving system 34, and auto-park system 36 are provided as part of traffic jam identification system 20. In some embodiments, traffic jam identification system 20 is separate from primary vehicle 10 which communicates with traffic jam identification system 20 remotely.

Traffic jam identification system 20 includes certain components for detecting and analyzing characteristics of secondary vehicles 104, 204 as suggested in FIG. 7. A secondary vehicle data collector 21 is provided on primary vehicle 10 and is configured to capture data 12 including emissions 111-117 of secondary vehicles 104, 204. In the illustrative embodiment, secondary vehicle data collector 21 includes a first camera for obtaining image data regarding light emissions, a second camera for obtaining image data regarding thermal emissions, such as through infrared signals for example, a microphone for obtaining audio date regarding audio emissions, and a radio receiver for obtaining signal data regarding radio emissions coming from secondary vehicles 104, 204. Secondary vehicle data collector 21 may be coupled to primary vehicle 10 in an area where a wide range of views are visible, such as a hood, roof, side mirror, rear-view mirror, front fascia, or dashboard 13 of primary vehicle 10, to name a few.

In some embodiments, audio emissions include passenger voices, such as indicated at 115 in FIG. 2, sounds from an entertainment system, engine noise, and braking noise, to name a few. In some embodiments, radio emissions include distance sensor signals, ultrasonic parking signals, blind spot radar, and adaptive cruise control radar such as indicated at 117, wi-fi signals, BLUETOOTH signals, cellphone signals, and entertainment system signals, such as indicated at 116, to name a few. In some embodiments, light emissions include tail or brake light emissions, such as indicated at 113, headlamp or turn signal emissions, such as indicated at 114, and internal cabin light emissions, to name a few. In some embodiments, thermal emissions include brake heat emissions, such as indicated at 113, engine heat emissions, such as indicated at 112, cabin heat emissions, and exhaust heat emissions, to name a few.

Secondary vehicle data collector 21 transmits at least a portion of collected data 12 into an image processor 23 configured to prepare the received data 12 for further processing and analysis as suggested in FIG. 7. In the illustrative embodiment, image processor 23 performs image pre-processing to facilitate thermal and light emission detection and analysis. For example, image processor 23 extracts frames of image data from secondary vehicle data collector 21 and apply image processing filters to adjust and enhance image properties (e.g., brightness, contrast, edge enhancement, noise suppression, etc.). Image processor 23 then transmits pre-processed image data to a secondary vehicle feature detection module 25. Secondary vehicle data collector 21 also transmits at least a portion of collected data 12 directly into secondary vehicle feature detection module 25, such as audio and radio emission data, for example.

Secondary vehicle feature detection module 25 processes the received data to detect and identify any active-status indicators based on the emissions from secondary vehicles 104, 204. For example, heat coming from the engine or brakes of a secondary vehicle at least partially indicates an active-status of the secondary vehicle. The same may be true for light emitted from brake lights or headlamps of the secondary vehicle. Audio signals received from passengers speaking and radio signals emitted from the secondary vehicle further indicate an active-status of the secondary vehicle. In some embodiments, secondary vehicle feature detection module 25 may be configured to perform object recognition functions to identify specific features of the secondary vehicles 104, 204, such as the tires, the engine hood, the glass windows, to name a few.

The identified active-status indicators are transmitted to a secondary vehicle status analyzer 27 where the indicators are compiled and categorized by type (e.g., light, thermal, audio, radio, etc.) as suggested in FIG. 7. These categorized active-status indicators are then transmitted to a traffic jam identification module 28 to determine their effect on a probability that secondary vehicles 104, 204 are in a traffic jam. In some embodiments, all active-status indicators have an equal effect on the probability that secondary vehicles 104, 204 are in a traffic jam. In some embodiments, some active-status indicators have an increased effect on the probability that secondary vehicles 104, 204 are in a traffic jam over other active-status indicators. For example, in some embodiments, active-status indicators based on thermal emissions increase the probability that secondary vehicles 104, 204 are in a traffic jam more than other active-status indicators based on other types of emissions.

Traffic jam identification system 20 also receives and uses location data of primary vehicle 10 in determining whether secondary vehicles 104, 204 are in a traffic jam as suggested in FIG. 7. Navigation system 14 communicates with traffic jam identification system 20 to provide location data of primary vehicle 10 to a vehicle location data collector 22. In some embodiments, vehicle location data collector 22 may be provided as part of navigation system 14.

The location data of primary vehicle 10 may be transmitted to a location categorization module 24 which may be configured to identify and categorize the location of primary vehicle 10 as suggested in FIG. 7. For example, certain roadways, such as highway 100 are considered controlled access roadways where pedestrians are restricted from entering. In some embodiments, a controlled access categorization may be beneficial when engaging the autonomous driving function of primary vehicle 10 because it may be highly unlikely for a pedestrian to be in the roadway. Other roadways, such as residential roadway 200, are considered non-controlled access roadways where pedestrians are likely to be present. In some embodiments, a non-controlled access designation may be a signal that access to the autonomous driving function of primary vehicle 10 should be blocked because it may be likely that pedestrians are present and potentially in the roadway on which primary vehicle 10 may be travelling. In the illustrative embodiment, location categorization module 24 communicates with a categorization database 26 which contains categorization data for different roadways which can be used by location categorization module 24 to categorize the location of primary vehicle 10.

Location categorization module 24 transmits the categorized location information to traffic jam identification module 28 for inclusion in the probability calculation of whether secondary vehicles 104, 204 are in a traffic jam as suggested in FIG. 7. In some embodiments, roadways categorized as controlled access indicate a strong probability that adjacent secondary vehicles are in a traffic jam because cars are not usually parked on a controlled access roadway. In some embodiments, location categorization data, alone, may be insufficient to raise the probability that secondary vehicles 104, 204 are in a traffic jam to the threshold level. In some embodiments, a roadway categorized as controlled access, alone, raises the probability that secondary vehicles 104, 204 are in a traffic jam to the threshold level.

In some embodiments, certain locations do not have a predetermined categorization. In some embodiments, the threshold probability that secondary vehicles 104, 204 are in a traffic jam may be raised where location categorization data may be unavailable. In such an embodiment, other factors, such as whether secondary vehicles 104, 204 are in lane with primary vehicle 10, are included to calculate the probability that secondary vehicles 104, 204 are in a traffic jam on a controlled access roadway. For example, categorization database does not include categorization data regarding a four-lane divided roadway running through a rural area. This roadway, however, is unlikely to have pedestrians thereon, and would be considered controlled access to allow activation of the automated driving function of primary vehicle 10 if the secondary vehicles are in lane with primary vehicle 10 and the probability that secondary vehicles are in a traffic jam reaches the threshold limit based on the collected data 12. This categorization may be then added to categorization database 26 for later use. In some embodiments, categorization database 26 may be separate from primary vehicle 10 which communicates with categorization database 26 remotely.

Figure 8A:
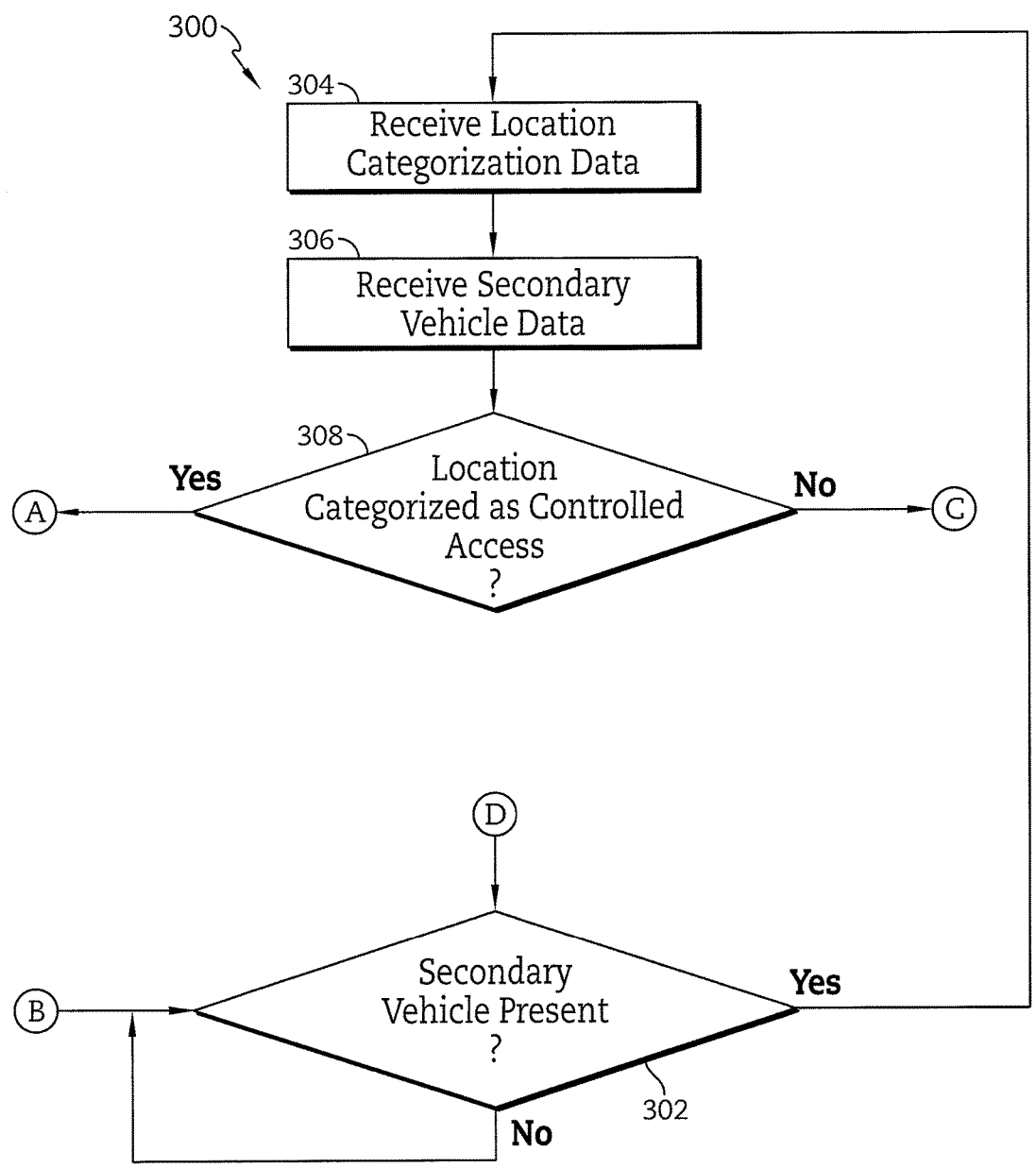
FIGS. 8A-8C show a flow diagram illustrating a methodology for operating a traffic jam identification system in accordance with the present disclosure.
Figure 8B:
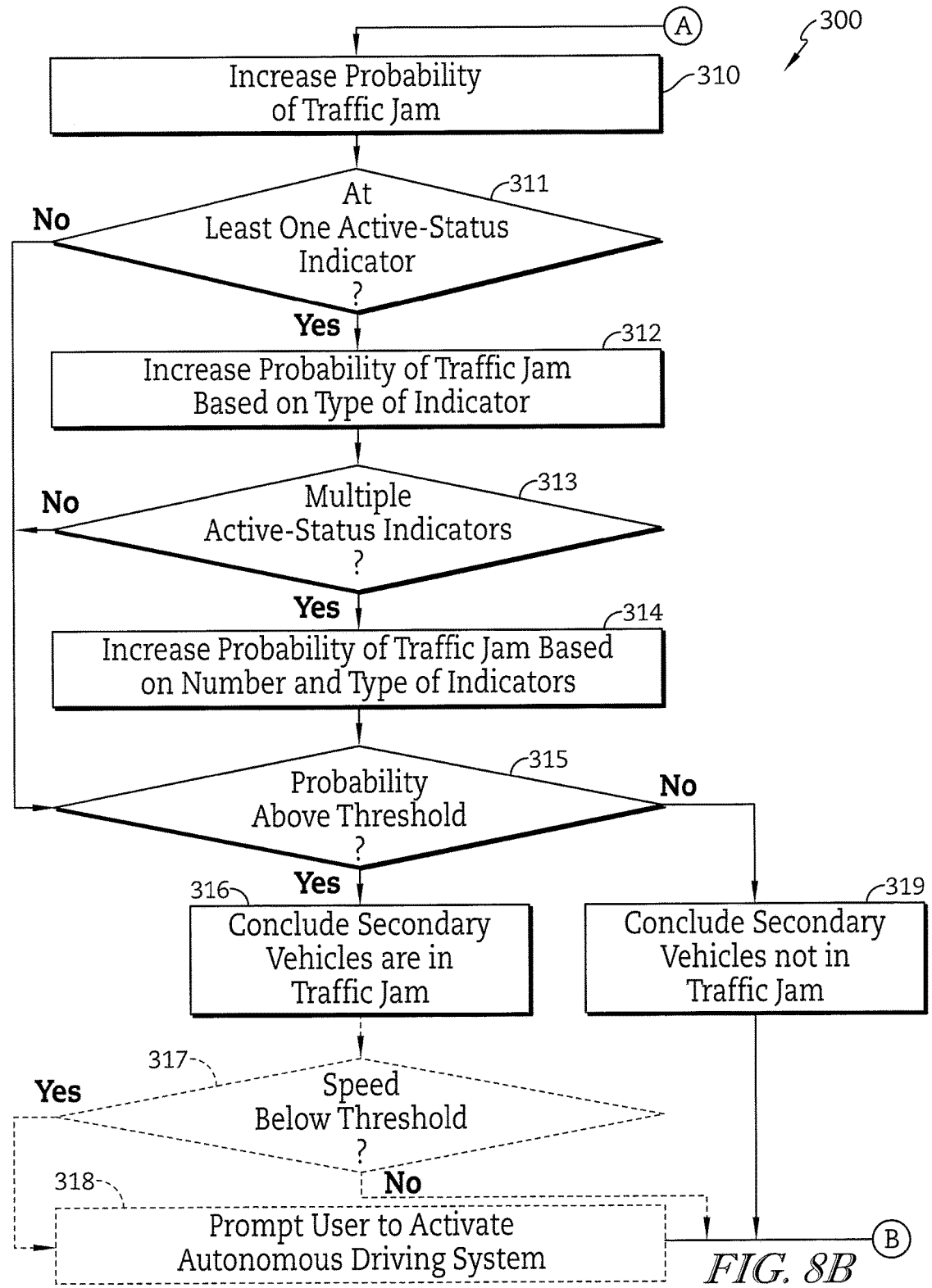
Figure 8C:
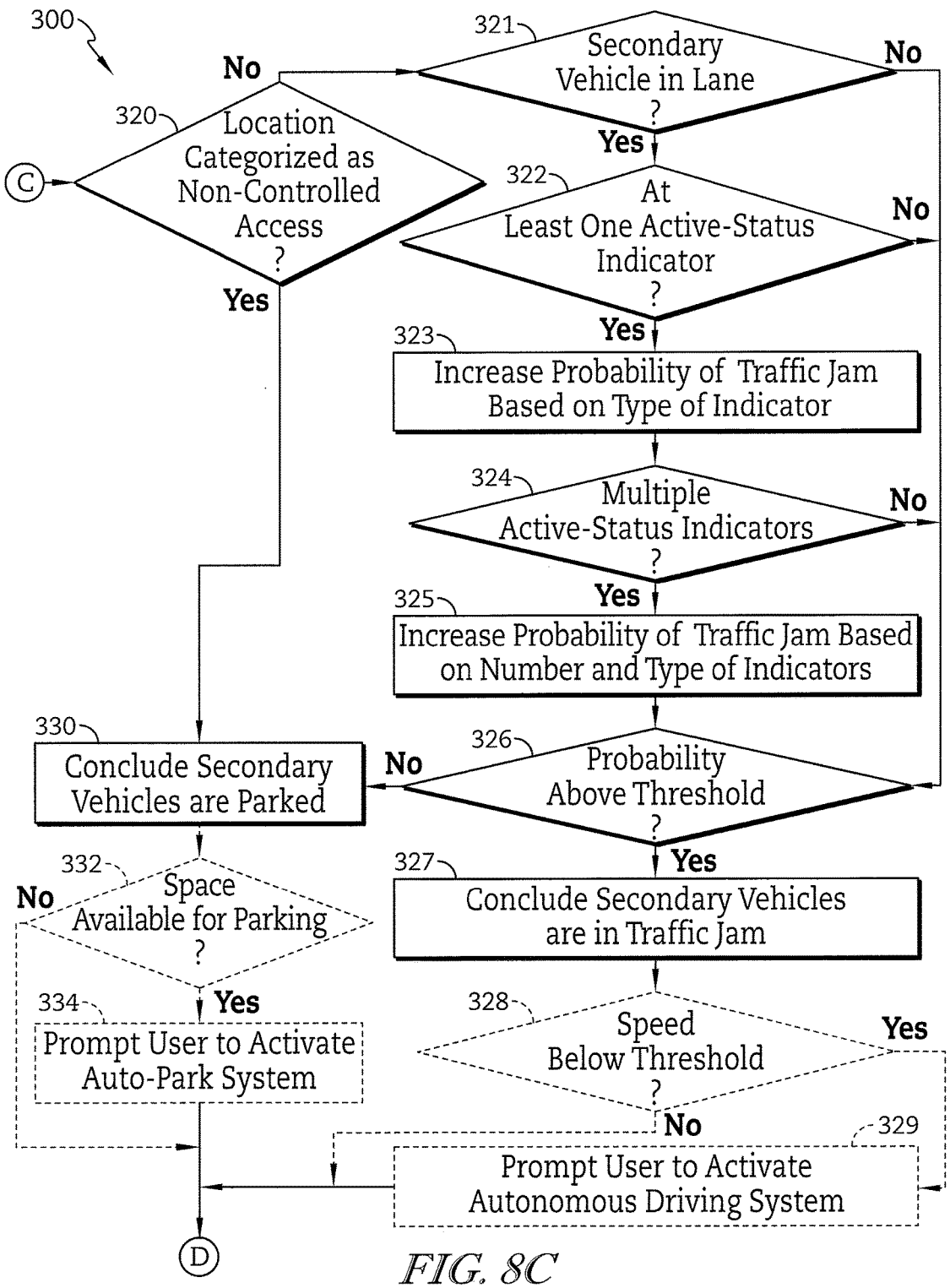

FIGS. 8A-8C show an exemplary method of operation 300 of traffic jam identification module 28. The method of operation 300 begins with monitoring operations 302 to identify whether secondary vehicles are adjacent to primary vehicle 10 as suggested in FIG. 8A. If secondary vehicles are detected, receiving operations 304, 306 begin in which traffic jam identification module 28 receives location categorization data of primary vehicle 10 and secondary vehicle data, including any active-status indicators. In operation 308, traffic jam identification module 28 identifies whether the location of primary vehicle 10 may be categorized as controlled access. If so, method of operation 300 proceeds along track A to operation 310, in which traffic jam identification module 28 increases the probability that the adjacent secondary vehicles are in a traffic jam as suggested in FIG. 8B.

In operation 311, traffic jam identification module 28 determines whether any active-status indicators of the adjacent secondary vehicles were identified as suggested in FIG. 8B. If not, operation 315 begins where traffic jam identification module 28 compares the calculated probability that the adjacent secondary vehicles are in a traffic jam against a predetermined threshold limit. At this point, if no active-status indicators are identified, it may be unlikely that the calculated probability has reached the threshold limit and traffic jam identification module 28 would conclude that the adjacent secondary vehicles are not in a traffic jam in operation 319.

If traffic jam identification module 28 determines that at least one active-status indicator was identified, then traffic jam identification module 28 further increases the probability that the adjacent secondary vehicles are in a traffic jam based on the type of active-status indicator identified in operation 312 as suggested in FIG. 8B. In operation 313, traffic jam identification module 28 determines whether multiple active-status indicators of the adjacent secondary vehicles were identified. If not, operation 315 begins where traffic jam identification module 28 compares the calculated probability that the adjacent secondary vehicles are in a traffic jam against the predetermined threshold limit. In some embodiments, the one active-status indicator that was identified further increases the probability that the adjacent secondary vehicles are in a traffic jam to the threshold limit and traffic jam identification module 28 would conclude that the adjacent secondary vehicles are in a traffic jam in operation 316. In some embodiments, the one active-status indicator that was identified does not increases the probability that the adjacent secondary vehicles are in a traffic jam to the threshold limit, and traffic jam identification module 28 would conclude that the adjacent secondary vehicles are not in a traffic jam in operation 319.

If traffic jam identification module 28 determines that multiple active-status indicators were identified, then traffic jam identification module 28 further increases the probability that the adjacent secondary vehicles are in a traffic jam based on the number and type of active-status indicators identified in operation 314 as suggested in FIG. 8B. Operation 315 then begins where traffic jam identification module 28 compares the calculated probability that the adjacent secondary vehicles are in a traffic jam against the predetermined threshold limit. It may be likely that the multiple active-status indicators identified have increased the probability to the threshold limit and traffic jam identification module 28 would conclude that the adjacent secondary vehicles are in a traffic jam in operation 316. In some embodiments, the multiple active-status indicators identified do not increases the probability that the adjacent secondary vehicles are in a traffic jam to the threshold limit, and traffic jam identification module 28 would conclude that the adjacent secondary vehicles are not in a traffic jam in operation 319.

In one illustrative embodiment, optional operations 317, 318 are performed if traffic jam identification module 28 concludes that the adjacent secondary vehicles are in a traffic jam in operation 316 as suggested in FIG. 8B. For example, traffic jam identification module 28 optionally determines if primary vehicle 10 may be travelling at a speed below a predetermined threshold limit in operation 317. If so, a user may be prompted to activate the autonomous driving function of primary vehicle 10 in operation 318. If not, or if traffic jam identification module 28 concludes that the adjacent secondary vehicles are not in a traffic jam in operation 319, the method of operation 300 proceeds along track B to operation 302 where monitoring resumes as suggested in FIG. 8A. Other optional operations are contemplated if traffic jam identification module 28 concludes that the adjacent secondary vehicles are in a traffic jam in operation 316, such as traffic monitoring and mapping operations, for example.

If traffic jam identification module 28 identifies that the location of primary vehicle 10 may not be categorized as controlled access in operation 308, then method of operation 300 proceeds along track C to operation 320 as suggested in FIGS. 8A and 8C. In operation 320, traffic jam identification module 28 identifies whether the location of primary vehicle 10 may be categorized as non-controlled access as suggested in FIG. 8C. If so, traffic jam identification module 28 concludes that the adjacent secondary vehicles are parked in operation 330. In one illustrative embodiment, optional operations 332, 334 are performed if traffic jam identification module 28 concludes that the adjacent secondary vehicles are parked in operation 330. For example, traffic jam identification module 28 optionally determines if there is space available for primary vehicle 10 to park in operation 332. If so, a user may be prompted to activate the auto-park function of primary vehicle 10. If not, the method of operation 300 proceeds along track D to operation 302 where monitoring resumes as suggested in FIG. 8A.

If traffic jam identification module 28 identifies that the location of primary vehicle 10 may also not be categorized as non-controlled access in operation 320, then traffic jam identification module 28 determines whether at least one of the adjacent secondary vehicles may be in lane with primary vehicle 10 in operation 321 as suggested in FIG. 8C. If not, operation 326 begins where traffic jam identification module 28 compares the calculated probability that the adjacent secondary vehicles are in a traffic jam against a predetermined threshold limit. At this point, if no secondary vehicles are in lane with primary vehicle 10, it may be unlikely that the calculated probability has reached the threshold limit and traffic jam identification module 28 would conclude that the adjacent secondary vehicles are parked in operation 330.

If traffic jam identification module 28 determines that at least one of the adjacent secondary vehicles may be in lane with primary vehicle 10, then traffic jam identification module 28 determines whether any active-status indicators of the adjacent secondary vehicles were identified in operation 322 as suggested in FIG. 8C. If not, operation 326 begins where traffic jam identification module 28 compares the calculated probability that the adjacent secondary vehicles are in a traffic jam against the predetermined threshold limit. At this point, if no active-status indicators are identified, it may be unlikely that the calculated probability has reached the threshold limit and traffic jam identification module 28 would conclude that the adjacent secondary vehicles are parked in operation 330.

If traffic jam identification module 28 determines that at least one active-status indicator was identified, then traffic jam identification module 28 further increases the probability that the adjacent secondary vehicles are in a traffic jam based on the type of active-status indicator identified in operation 323 as suggested in FIG. 8C. In operation 324, traffic jam identification module 28 determines whether multiple active-status indicators of the adjacent secondary vehicles were identified. If not, operation 326 begins where traffic jam identification module 28 compares the calculated probability that the adjacent secondary vehicles are in a traffic jam against the predetermined threshold limit. At this point, if only one active-status indicator may be identified, it may be unlikely that the calculated probability has reached the threshold limit and traffic jam identification module 28 would conclude that the adjacent secondary vehicles are parked in operation 330. In some embodiments, the one active-status indicator that was identified further increases the probability that the adjacent secondary vehicles are in a traffic jam to the threshold limit and traffic jam identification module 28 would conclude that the adjacent secondary vehicles are in a traffic jam in operation 327.

If traffic jam identification module 28 determines that multiple active-status indicators were identified, then traffic jam identification module 28 further increases the probability that the adjacent secondary vehicles are in a traffic jam based on the number and type of active-status indicators identified in operation 325 as suggested in FIG. 8C. Operation 326 then begins where traffic jam identification module 28 compares the calculated probability that the adjacent secondary vehicles are in a traffic jam against the predetermined threshold limit. It may be likely that the multiple active-status indicators identified have increased the probability to the threshold limit and traffic jam identification module 28 would conclude that the adjacent secondary vehicles are in a traffic jam in operation 327. In some embodiments, the multiple active-status indicators identified do not increases the probability that the adjacent secondary vehicles are in a traffic jam to the threshold limit, and traffic jam identification module 28 would conclude that the adjacent secondary vehicles are parked in operation 330.

In one illustrative embodiment, optional operations 328, 329 are performed if traffic jam identification module 28 concludes that the adjacent secondary vehicles are in a traffic jam in operation 327 as suggested in FIG. 8C. For example, traffic jam identification module 28 optionally determines if primary vehicle 10 may be travelling at a speed below a predetermined threshold limit in operation 328. If so, a user may be prompted to activate the autonomous driving function of primary vehicle 10 in operation 329. If not, or if traffic jam identification module 28 concludes that the adjacent secondary vehicles are parked in operation 330, the method of operation 300 proceeds along track D to operation 302 where monitoring resumes as suggested in FIG. 8A. Other optional operations are contemplated if traffic jam identification module 28 concludes that the adjacent secondary vehicles are in a traffic jam in operation 327, such as traffic monitoring and mapping operations, for example.

In illustrative embodiments, autonomous driving systems, work on certain roads in certain situations—for example, only in a traffic jam on a road with no pedestrian traffic. Hence, there may be a motivation to identify whether the current road may be a freeway or highway (where pedestrians are not allowed) or a city road (where pedestrians may be allowed; even though they may not be present at that very moment). In this case, if the system detects a row of stationary vehicles on the side of the road, it may be necessary to determine if the cars are in a traffic jam, or simply parked. In the former case the automated driving function may be allowed to be activated, while in the latter case it may not. This may be because the latter case, the parked vehicles indicate that pedestrian traffic may be possible on that road even though a pedestrian may not be present at that very moment.

In illustrative embodiment, a system distinguishes whether vehicles on the side of the road are temporarily stopped, like when in a traffic jam, or parked for a time being. One or more factors may be used in the determination:

a) Detection of "stationary-but-turned-ON" vehicles using infrared signature—hot exhaust gas or engine components in the case of internal combustion engines, or warm electronics in the case of electric motors, or heat from the tire on the undercarriage of the secondary vehicle, or detection of heat radiating brake discs, or depending on the outside temperature detection of heat radiation/absorption of the glass windows of the car.

b) Detection of internal cabin noise by microphone, such as a laser microphone. A laser microphone can detect vibrations on glass windows from music or conversation from inside a vehicle, indicating occupancy.

c) Camera-based brake light detection.

d) Detection of signals from active sensors. Many vehicles have active laser or parking ultrasonic sensors whose output can be detected using radio sensors or receivers e) Triangulation of cell phone signals. If, by triangulation of characteristic cell phone frequencies, a cell phone may be estimated to be located inside a vehicle, it indicates the secondary vehicle may be likely occupied.

f) Lane position—if cars are positioned more to the side of a lane rather than towards a center of the lane, it may be likely that the cars are parked.

In illustrative embodiments, positive results of these tests increase the likelihood that a vehicle may be in a traffic jam and not parked. A module could then take the input of all of these tests, on every detected vehicle in some cases, and continuously update an overall estimate of whether a row of vehicles may be parked or in a traffic jam (sometimes referred to as the "traffic jam probability" vs. "parked probability"). Based on this knowledge, the system may allow or disallow certain capabilities of the primary vehicle, or provide information and/or alerting to the driver.

In illustrative embodiments, the automated driving system would only be allowed to be activated if the traffic jam probability exceeds a certain threshold. In a traffic jam, all the secondary vehicles have more or less similar warm/hot tires and the engine hood/motor also radiates similar amount of heat. In a row of parked cars, it may be very likely that at least one car, or to be more precise the parts of one car, have reached an ambient temperature. When the car is parked, the heat from the motor, from the tires and brakes dissipate in the environment and no additional heat may be produced. The heat of a car can come from the combustion engine, from mechanical friction or from electrical losses, for example. In electric vehicles there could also be heat generation though charging and discharging of batteries by chemical processes inside the batteries.

In illustrative embodiments, a camera installed in the primary vehicle can identify a row of vehicles by object recognition. An infrared sensor or an infrared camera detects the temperature profile of the identified object. The object recognition may be further capable of recognizing detailed regions of the recognized vehicle objects, like the tires, the engine hood, the glass windows, etc. The detailed regions are further analyzed by a radiation temperature sensor and the overall temperature of the detected region may be averaged.

In illustrative embodiments, an overall probability of parking or driving of each recognized vehicle object may be calculated. From the single vehicle probability an overall probability of a row of detected vehicle may be determined, whether those vehicles are parked or driving/in a traffic jam. If there is at least one car in the row of vehicles, where the detected regions are of a temperature about the ambient temperature or significantly below the operating temperature of the secondary vehicles, than the probability that all the secondary vehicles in this row are parked is high. In order to improve the detection algorithm, an ambient temperature could be taken into account. On a hot summer day, the temperature of "just parked" vehicles may be decreasing slower than on a cold winter day.

In illustrative embodiments, the temperature of a row of parked vehicles may be only determined below a predetermined speed or a speed threshold value that may be depending upon the driving situation. The parked vehicle detection can also be disabled depending on the street type. If the navigation system provides the information that the primary vehicle currently may be on a highway or an entry or exit ramp (e.g. waiting in front of a traffic light), a parking possibility is not given. It may be very likely that a row of detected standing vehicles are in a traffic jam on a highway. On the other hand, if the street is marked as a one lane street, than the probability of a detected row of standing vehicles may be very likely to be row of parked vehicles. During colder ambient temperatures, the possibility that the driver will have the heat in vehicles turned on may be high. Therefore the glass windows will also radiate heat from the inside of the secondary vehicle. The detection of a heat radiating window pane therefore adds to the probability of a vehicle being in a driving state. If vehicles on the right lane (or left lane in some countries) are detected to be in a traffic jam next to a row of vehicles "waiting", then the automatic or semi-automatic parking functions would be disabled (for autonomous and non-autonomous cars).

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An identification system for use in a primary vehicle to identify a status of a group of secondary vehicles, the system comprising:
   a secondary vehicle data collector for obtaining data regarding emissions from a secondary vehicle of the group of secondary vehicles;
   a secondary vehicle feature detection module for detecting active-status indicators;
   a secondary vehicle status analyzer for analyzing characteristics of detected active-status indicators;
   means for determining a probability that the group of secondary vehicles are part of a traffic jam based on the active-status indicators and determining whether the group of secondary vehicles are in a traffic jam or parked based on a comparison of the determined probability and a predetermined threshold probability level; and
   means for prompting a user of the primary vehicle to activate an autonomous driving function in response to a determination that the secondary vehicles are part of a traffic jam and the primary vehicle is travelling below a speed threshold.

2. The identification system of claim 1, wherein the secondary vehicle data collector includes
   a first camera for obtaining image data regarding light emission from the secondary vehicle;
   a second camera for obtaining image data regarding thermal emissions from the secondary vehicle;
   a microphone for obtaining audio date regarding audio emissions from the secondary vehicle; and
   a radio receiver for obtaining signal data regarding radio transmissions from the secondary vehicle.

3. The identification system of claim 1, further comprising a vehicle location data collector for obtaining location information of the primary vehicle.

4. The identification system of claim 3, further comprising a location categorization module for analyzing obtained location data to categorize a location of the primary vehicle.

5. The identification system of claim 4, wherein the probability that the group of secondary vehicles are in a traffic jam is increased in response to the location of the primary vehicle being categorized as controlled access.

6. The identification system of claim 4, further comprising an auto-park system for providing an auto-park function of the primary vehicle.

7. The identification system of claim 6, wherein the identification system prompts a user of the primary vehicle to activate the auto-park function in response to the location of the primary vehicle being categorized as non-controlled access and there being space available for the primary vehicle to park at the location.

8. The identification system of claim 1, further comprising an autonomous driving system for providing the autonomous driving function of the primary vehicle in response to the primary vehicle travelling below a predetermined speed threshold level.

9. The identification system of claim 8, wherein the identification system prompts a user of the primary vehicle to activate the autonomous driving function in response to the probability that the group of secondary vehicles are in a traffic jam reaching the threshold probability level and the primary vehicle travelling at a speed below the speed threshold level.

10. A method for identifying whether a group of secondary vehicles adjacent to a primary vehicle are in a traffic jam or parked, the method comprising:
    capturing data regarding emissions from a secondary vehicle of the group of secondary vehicles;
    identifying active-status indicators based on the emissions;
    categorizing the active-status indicators; and
    determining a probability that the secondary vehicles are in a traffic jam based on the active-status indicators;
    determining whether the group of secondary vehicles is in a traffic jam or parked based on a comparison of the determined probability with a threshold probability level; and
    prompting a user of the primary vehicle to activate an autonomous driving function in response to a determination that the secondary vehicles are part of a traffic jam and the primary vehicle is travelling below a speed threshold.

11. The method of claim 10, wherein the group of secondary vehicles is in a traffic jam if the determined probability is at or above the threshold probability level.

12. The method of claim 10, further comprising capturing location data for the primary vehicle.

13. The method of claim 12, further comprising categorizing the location data.

14. The method of claim 13, wherein determining the probability that the secondary vehicles are in a traffic jam is also based on the categorized location data.

15. The method of claim 14, wherein determining the probability that the secondary vehicles are in a traffic jam includes increasing the probability for each categorized active-status indicator and increasing the probability in response to the location being categorized as controlled access.

16. The method of claim 10, wherein determining the probability that the secondary vehicles are in a traffic jam includes increasing the probability for each categorized active-status indicator.

17. The method of claim 10, further comprising prompting a user of the primary vehicle to activate an auto-park function in response to a determination that the secondary vehicles are parked and there is adjacent space for the primary vehicle to park.

18. An in-vehicle identification system for use in a primary vehicle to identify a status of a group of secondary vehicles, the in-vehicle system comprising:
- a first camera for obtaining image data regarding light emission from the secondary vehicle;
- a second camera for obtaining image data regarding thermal emissions from the secondary vehicle;
- a microphone for obtaining audio date regarding audio emissions from the secondary vehicle;
- a radio receiver for obtaining signal data regarding radio transmissions from the secondary vehicle;
- a vehicle location data collector for obtaining location information of the primary vehicle;
- a location categorization module for analyzing obtained location data to categorize a location of the primary vehicle;
- a secondary vehicle feature detection module for detecting active-status indicators based on the data received from the first camera, the second camera, the microphone, the radio receiver, and the vehicle location data collector;
- a secondary vehicle status analyzer for analyzing characteristics of detected active-status indicators;
- a traffic jam identification module configured to determine a probability that the group of secondary vehicles are part of a traffic jam based on the active-status indicators and to compare the determined probability and a predetermined threshold probability level to determine whether the group of secondary vehicles are in a traffic jam or parked; and
- an autonomous driving system for providing an autonomous driving function of the primary vehicle in response to the primary vehicle travelling below a predetermined speed threshold level,
- wherein the identification system prompts a user of the primary vehicle to activate the autonomous driving function in response to the probability that the group of secondary vehicles are in a traffic jam reaching the threshold probability level and the primary vehicle travelling at a speed below the speed threshold level.

19. The in-vehicle system of claim 18, further comprising
- an auto-park system for providing an auto-park function of the primary vehicle,
- wherein the identification system prompts a user of the primary vehicle to activate the auto-park function in response to the location of the primary vehicle being categorized as non-controlled access and there being space available for the primary vehicle to park at the location.

* * * * *